3,318,904
NITROTHIAZOLYL AMIDINES
Paul Schmidt, Therwil, Basel-Land, and Max Wilhelm and Kurt Eichenberger, Basel, Switzerland, assignors to Ciba Corporation, New York, N.Y., a corporation of Delaware
No Drawing. Filed Aug. 15, 1963, Ser. No. 302,453
Claims priority, application Switzerland, Aug. 17, 1962, 9,850/62; June 19, 1963, 7,630/63
5 Claims. (Cl. 260—306.8)

The present invention relates to new amidines. Especially it concerns N-[5-nitro-thiazolyl-2]-amidines, and their salts.

The new compounds may contain further substituents, for example in position 4 of the thiazolyl residue. Particularly suitable substituents are, for example, substituted or unsubstituted aliphatic, araliphatic or aromatic hydrocarbon radicals, for example alkyl or alkenyl radicals such as lower alkyl or alkenyl radicals, for example methyl, ethyl, allyl, propyl, isopropyl, straight or branched butyl, pentyl, hexyl or heptyl groups which may be linked in any desired position; aralkyl groups such as phenylalkyl groups, for example phenyl-lower alkyls such as benzyl, phenylethyl, phenylpropyl or phenylbutyl radicals, or aryl such as phenyl radicals; the afore-mentioned aryl and aralkyl residues may be further substituted, more especially in the aromatic nuclei. As substituents of the aromatic nuclei there are suitable, for example, hydroxyl groups, lower alkoxy groups such as methoxy, ethoxy, propoxy or butoxy groups, methylenedioxy groups, lower alkyl groups such as the above-mentioned, nitro groups, amino groups such as free amino groups or mono- or di-lower alkyl-amino groups, for example mono- or di-methylamino or -ethylamino groups, or halogen atoms such as fluorine, chlorine or bromine or the pseudo-halogen trifluoromethyl.

The amidine nitrogen atoms may be unsubstituted or substituted. Above all, the N'-nitrogen atom may be mono- or di-substituted, for example by substituted or unsubstituted aliphatic, cycloaliphatic, cycloaliphatic-aliphatic, araliphatic or aromatic hydrocarbon radicals, for example by alkyls, for example those mentioned above, by alkenyl groups such as lower alkenyl groups, such as allyl or methallyl radicals, by alkylene groups which may be interrupted by hetero atoms such as oxygen, sulfur or nitrogen, for example lower alkylene radicals which may be interrupted by hetero atoms such as butylene-(1:4), butylene-(1:5), hexylene-(1:5), hexylene-(1:6), hexylene-(2:5), heptylene-(1:7), heptylene-(2:7), heptylene-(2:6), 3-oxa- or -3-aza-pentylene-(1:5), 3-oxo- or 3-aza-hexylene-(1:6) residues, cycloalkyl, cycloalkenyl, cycloalkyl-alkyl or cycloalkenyl-alkyl groups such as cyclopentyl, cyclohexyl, cyclopentenyl or cyclohexenyl residues, cyclopentyl-, cyclohexyl-, cyclopentenyl-, cyclohexenyl-methyl or -ethyl groups, aralkyl or aryl groups, for example those mentioned above.

The N'-nitrogen atom, together with its substituents, forms primarily a mono- or di-lower alkyl-amino group such as a methylamino, dimethylamino, ethylamino or diethylamino group, a phenyl-lower alkylamino, N-phenyl-lower alkyl-N-lower alkylamino or di-(phenyl-lower alkyl)-amino group such as a benzylamino, phenylethylamino, benzyl-lower alkylamino, dibenzylamino or diphenylethylamino group, or a pyrrolidino, piperidino, morpholino, thiamorpholino or piperazino group, for example the N-methylpiperazino group.

The amidines are preferably derived from aliphatic, araliphatic or aromatic carboxylic acids, more especially from fatty acids, such as lower alkane-carboxylic acids, such as formic acid, acetic acid, propionic acid, butyric acid, valeric acid, aryl- or arylalkane-carboxylic acids such as benzoic acids or phenyl-lower alkane-carboxylic acids, for example phenylacetic or phenylpropionic acids which may be substituted in the manner defined above for the aromatic nuclei.

The new compounds possess valuable pharmacological, especially antiparasitic properties. For example, in experiments on hamsters, chickens or mice, they display an activity against protozoae and vermiculi, for example amoebae and coccidiae, as well as schistosomes. They are, accordingly, useful as antiparasitic agents. The new compounds are also valuable intermediates for the manufacture of other useful substances.

Special mention is deserved the compounds of the formula

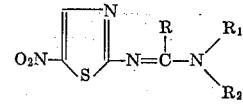

in which R represents hydrogen, lower alkyl or a phenyl radical, and $R_1$ and $R_2$ each represents hydrogen or lower alkyl, or $R_1+R_2+$the N-atom may form a pyrrolidino, piperidino, piperazino, morpholino or thiamorpholino residue and primarily N-(5-nitro-thiazolyl-2-)-N':N'-dimethyl-formamidine.

The new compounds are obtained by known methods, for example in the following manner: a 5-nitro-2-aminothiazole is reacted with an enolether (imino ether) or enolester (imino ester) or acetal of a carboxylic acid amide or a salt thereof.

Particularly suitable enolethers are those of lower alkanols, such as methanol or ethanol. Particularly suitable enolesters are those of chloroformic or p-toluenesulfonic acid or imide chlorides or amide chlorides. As acetals there may be used more particularly those in which the alcohol component is a lower alkanol or alkandiol, for example dimethylformamide dimethylacetal.

The afore-mentioned reactions are performed in the usual manner in the presence or absence of diluents, condensing agents and/or catalysts at room temperature or with cooling or heating, if desired under superatmospheric pressure and/or under an inert gas.

Depending on the reaction conditions and starting materials employed, the end products are obtained in the free form or in the form of their salts which are also included within the scope of the invention. For example, basic, neutral, acid or mixed salts, if desired also hemi-, mono-, sesqui- or poly-hydrates may be obtained. The salts of the end products may be converted in a manner known per se, for example with an alkali or an ion exchange resin, into the free bases. From the latter, salts may be obtained by reaction with an organic or inorganic acid, particularly with an acid which is suitable for the formation of a therapeutically acceptable salt. Examples of such acids are: hydrohalic acids, sulfuric acids, phosphoric acids, nitric acid, perchloric acid; aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic, pyruvic acid; phenylacetic, benzoic, p-aminobenzoic, anthranilic, p-hydroxybenzoic, salicyclic or p-aminosalicylic acid, embonic acid, methanesulfonic, ethanesulfonic, hydroxyethanesulfonic, ethylenesulfonic acid; halogenbenzenesulfonic, toluenesulfonic, naphthalenesulfonic acids or sulphanilic acid; methionine, tryptophan, lysine or arginine.

The above or other salts of the new compounds, such, for example, as the picrates, may also be used for the purification of the resulting bases by converting the bases into the salts, separating the latter and liberating the bases from the salts. In view of the close relation between a base in the free form and in the form of a salt thereof, whenever a free base is referred to in this context, a corresponding salt is also intended, provided such is possible or appropriate under the circumstances.

The invention includes also any modification of the present process in which an intermediate obtainable at any stage of the process is used as starting material and any remaining step or steps is/are carried out, or the process is discontinued at any stage thereof, or in which the starting materials are formed under the reaction conditions, or in which the reactants are alternatively used in the form of their salts.

Thus, for example the enol-ethers and enolesters of the carboxylic acid amides may be formed under the reaction conditions employed. It is possible, for example, to react the selected acid amide with the 5-nitro-2- aminothiazole in the presence of an acid halide.

The reactions of the invention are preferably performed with the use of starting materials that yield the above-mentioned preferred compounds.

The starting materials are known or can be prepared by as such known methods.

The new compounds may be used, for example in the form of pharmaceutical preparations containing said compounds of their salts in admixture or conjunction with an organic or inorganic, solid or liquid pharmaceutical excipient suitable for enteral or parenteral administration. Suitable excipients are substances that do not react with the new compounds, for example water, gelatine, lactose, starches, stearyl alcohol, magnesium stearate, talcum, vegetable oils, benzyl alcohols, gums, propylene glycol, polyalkylene glycols, white petroleum jelly, cholesterol or other known medicinal excipients. The pharmaceutical preparations may be, for example, tablets, dragees or capsules, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain other therapeutically useful substances. The pharmaceutical preparations are formulated by the usual methods.

The new compounds may also be used in the form of animal feedingstuffs or of additives to feedingstuffs, with the use, for example, of the usual extenders and diluents or feedingstuffs respectively.

The following examples illustrate the invention:

EXAMPLE 1

A solution of 10 g. of 2-amino-5-nitrothiazole and 12 g. of para-toluenesulfonylchloride in 100 cc. of dimethyl-formamide is heated for 2 hours at 140° C., then cooled, water is added, and the precipitate formed is crystallized from alcohol, to yield N-[5-nitro-thiazolyl-2]-N':N'-dimethylformamidine of the formula

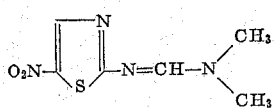

in yellow crystals melting at 156–157° C.

The hydrochloride of the above compound, prepared with the calculated quantity of alcoholic hydrochloric acid, melts at 188–190° C.

EXAMPLE 2

Phosgene is introduced with stirring in the course of two hours at room temperature into a solution of 10 grams of 2-amino-5-nitrothiazole in 75 grams of N-methyl-formanilide. The reaction mixture is then poured into 500 cc. of ice-water. A precipitate settles which is filtered, dried and recrystallized from a mixture of chloroform and petroleum ether for the purpose of purification. N-[5 - nitro - thiazolyl(2)] - N' -methyl - N' - phenyl - formamidine of the formula

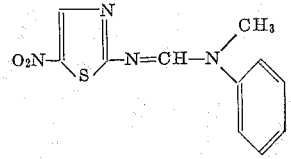

is obtained in the form of yellow crystals melting at 164–165° C.

EXAMPLE 3

12 grams of p-toluenesulfonyl-chloride and 10 grams of 2-amino-4-methyl-5-nitro-thiazole are added to 100 cc. of dimethyl-formamide and the whole is heated for 2 hours at 140° C. The dimethylformamide is then distilled in vacuo, the residue treated with water and the precipitate filtered off. After recrystallization from methanol, N-[4 - methyl - 5 - nitro - thiazolyl - (2)] - N':N' - dimethyl-formamidine of the formula

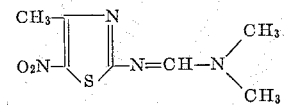

melting at 110–112° C. is obtained.

In an analogous manner N-[5-nitro-thiazolyl-(2)]-N':N'-diethyl-formamidine and N-[5-nitrothiazolyl-(2)]-N':N'-dimethyl-acetamidine may be obtained.

EXAMPLE 4

9 grams of dimethylformamide dimethyl acetal are added to a solution of 10 grams of 2-amino-4-methyl-5-nitro-thiazole in 75 cc. of benzene and the whole boiled for 2 hours under reflux. The solution is then evaporated in vacuo, and the residue recrystallized from methanol to yield N - [4 - methyl - 5 - nitro - thiazolyl - (2)]-N':N'-dimethylformamidine of the formula

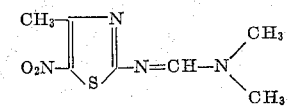

in the form of crystals melting at 110–112° C.

EXAMPLE 5

As additive to animal fodder, e.g. for poultry, the new compounds particularly the N-[5-nitrothiazolyl-(2)]-N',-N'-dimethylformamidine, may be mixed with cerelose (content of active compound e.g. 0.1–1% preferably 0.5%). This premix can then be added to the fodder in the usual manner, preferably in such an amount that the final concentration is about 0.001% of the active compound.

EXAMPLE 6

Tablets containing 100 mg. of N-[5-nitrothiazolyl-(2)]-N':N'-dimethyl formamidine may be prepared, for example with the following ingredients:

|  | Mg. |
|---|---|
| N - [5 - nitrothiazolyl - (2)] - N';N' - dimethyl-formamidine | 100.0 |
| Lactose | 90.0 |
| Wheat starch | 50.0 |
| Colloidal silicic acid with hydrolysed starch | 15.0 |
| Arrowroot | 25.0 |
| Stearic acid | 6.0 |
| Talc | 14.0 |
|  | 300.0 |

Method

N - [5 - nitrothiazolyl - (2)] - N':N' - dimethylform-amidine is homogeneously mixed with lactose and wheat starch and passed through a sieve having a 0.5 mm. mesh. Colloidal silicic acid with hydrolysed starch is added in portions to the powder mixture which is evenly moistened with water and kneaded until a plastic mass is formed. The latter is passed through a sieve having a 3 mm. mesh, dried at 45° C. and then passed through a sieve having a 1.5 mm. mesh. Arrowroot, stearic acid and talc in finely sieved form are added to the resulting granulate. The mixture is compressed in the conventional manner to tablets weighing 300 mg. and having a diameter of 9 mm.

What is claimed is:
1. A compound of the formula

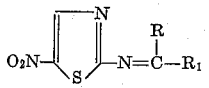

in which R stands for a member selected from the group consisting of methyl and phenyl and $R_1$ stands for a member selected from the group consisting of amino, mono-lower alkylamino, di-lower-alkylamino, pyrrolidino, piperidino, piperazino, morpholino and thiamorpholino.

2. An acid addition salt of a compound claimed in claim 1.

3. A compound of the formula

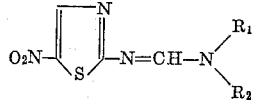

in which $R_1$ stands for phenyl and $R_2$ for lower alkyl.

4. An acid addition salt of a compound claimed in claim 3.

5. N - [5 - nitrothiazolyl - (2)] - N' - methyl - N'- phenylformamidine.

References Cited by the Examiner
UNITED STATES PATENTS

| | | | |
|---|---|---|---|
| 3,073,851 | 1/1963 | Steiger | 260—306.8 X |
| 3,143,571 | 8/1964 | Clemens | 260—564 |
| 3,182,053 | 5/1965 | Steiger | 260—306.8 X |

JOHN D. RANDOLPH, *Primary Examiner.*